(12) United States Patent
Shao et al.

(10) Patent No.: US 12,392,708 B2
(45) Date of Patent: *Aug. 19, 2025

(54) METHOD AND INTERNET OF THINGS (IOT) SYSTEM FOR CORROSION SUPERVISION OF GAS PIPELINE

(71) Applicant: CHENGDU QINCHUAN IOT TECHNOLOGY CO., LTD., Sichuan (CN)

(72) Inventors: Zehua Shao, Chengdu (CN); Yuefei Wu, Chengdu (CN); Junyan Zhou, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,259

(22) Filed: Apr. 10, 2024

(65) Prior Publication Data

US 2024/0255414 A1 Aug. 1, 2024

Related U.S. Application Data

(63) Continuation of application No. 18/317,909, filed on May 15, 2023, now Pat. No. 11,982,613.

(30) Foreign Application Priority Data

Mar. 8, 2023 (CN) .......................... 202310216731.9

(51) Int. Cl.
*G01N 17/02* (2006.01)
*F16L 58/10* (2006.01)
*F17D 5/00* (2006.01)

(52) U.S. Cl.
CPC .......... *G01N 17/02* (2013.01); *F16L 58/1027* (2013.01); *F17D 5/005* (2013.01)

(58) Field of Classification Search
CPC ....... F16L 58/00; F16L 58/1027; F17D 5/005; G01N 17/02
See application file for complete search history.

(56) References Cited

U.S. PATENT DOCUMENTS 7,941,282 B2   5/2011   Ziegel et al.
10,120,348 B2  11/2018  Vincent et al.
(Continued)

FOREIGN PATENT DOCUMENTS

AU    2630999 A   *  9/1999
CN    108916531 A    11/2018
(Continued)

OTHER PUBLICATIONS

Yuan, Geng et al., Application of Markov Chain in Prediction of Corrosion Conditions for Buried Gas Steel Pipeline, Journal of Harbin Institute of Technology, 42(8): 1328-1331, 2010.
(Continued)

*Primary Examiner* — Frederick L Lagman
(74) *Attorney, Agent, or Firm* — METIS IP LLC

(57) ABSTRACT

A method and an Internet of Things system for corrosion supervision of a gas pipeline are provided. The method includes: obtaining inspection data of a gas pipeline in a gas pipeline network; constructing a first pipeline diagram of the gas pipeline network based on the inspection data; determining a corrosion probability of the gas pipeline based on the first pipeline diagram using a corrosion probability model; determining one or more estimated pipeline corrosion regions based on the corrosion probability of the gas pipeline; obtaining in-depth inspection data of the gas pipeline by performing in-depth inspection on at least one of the
(Continued)

estimated pipeline corrosion regions; determining corrosion features of the one or more estimated pipeline corrosion regions based on gas monitoring data and the in-depth inspection data of the gas pipeline; and determining a repair plan based on the one or more estimated pipeline corrosion regions and/or the corrosion features.

15 Claims, 5 Drawing Sheets

(56) References Cited

U.S. PATENT DOCUMENTS

| | | | |
|---|---|---|---|
| 11,982,613 B2 * | 5/2024 | Shao | G01N 17/02 |
| 2009/0326865 A1 | 12/2009 | Ziegel et al. | |
| 2016/0101491 A1 | 4/2016 | Vincent et al. | |
| 2018/0365555 A1 | 12/2018 | Aslam | |
| 2023/0014791 A1 * | 1/2023 | Tinnea | G01N 17/02 |
| 2023/0083626 A1 | 3/2023 | Shao et al. | |

FOREIGN PATENT DOCUMENTS

| | | | | |
|---|---|---|---|---|
| CN | 110705176 A | | 1/2020 | |
| CN | 111104989 A | | 5/2020 | |
| CN | 111156425 A | | 5/2020 | |
| CN | 111536429 A | * | 8/2020 | F17D 5/00 |
| CN | 112883538 A | | 6/2021 | |
| CN | 113011636 A | | 6/2021 | |
| CN | 113167413 A | | 7/2021 | |
| CN | 114140625 A | | 3/2022 | |
| CN | 114565185 A | | 5/2022 | |
| CN | 115111537 A | | 9/2022 | |
| CN | 115545231 A | * | 12/2022 | F17D 5/005 |
| CN | 115614678 A | | 1/2023 | |
| JP | 2006183274 A | | 7/2006 | |
| KR | 102396452 B1 | | 5/2022 | |
| RU | 2720035 C1 | * | 4/2020 | |
| WO | 2021133265 A1 | | 7/2021 | |

OTHER PUBLICATIONS

Dong, Shaohua et al., Integrity Management System of Oil & Gas Pipelines, Oil & Gas Storage and Transportation, 2010, 8 pages.
First Office Action in Chinese Application No. 202310216731.9 mailed on Apr. 12, 2023, 23 pages.
Notification to Grant Patent Right for Invention in Chinese Application No. 202310216731.9 mailed on May 2, 2023, 5 pages.

* cited by examiner

500

METHOD AND INTERNET OF THINGS (IOT) SYSTEM FOR CORROSION SUPERVISION OF GAS PIPELINE

CROSS REFERENCE TO RELATED APPLICATIONS

This application is a continuation of U.S. Pat. No. 11,982,613, filed on May 15, 2023, which claims priority to Chinese Patent Application No. 202310216731.9, filed on Mar. 8, 2023, and the entire contents of each of which are hereby incorporated by reference.

TECHNICAL FIELD

The present disclosure relates to the field of Internet of Things technology and corrosion protection of gas pipelines, and in particular, to a method and an Internet of Things (IoT) system for corrosion supervision of a gas pipeline.

BACKGROUND

Gas is mainly transported through pipelines. With the popularity of gas, the daily demand for gas is increasing. As gas pipelines are often laid under the surface, the gas pipelines may leak due to corrosion caused by underground environmental factors, which may cause explosions, fires, and other accidents, resulting in casualties and property losses. In order to ensure the safety of gas supply, the corrosion of the gas pipelines should be taken seriously.

Therefore, it is desirable to propose a method for corrosion supervision of a gas pipeline, to effectively control the corrosion of gas pipeline, efficiently deal with pipeline corrosion and repair the gas pipeline, and improve the safety performance of the gas pipeline.

SUMMARY

One of the embodiments of the present disclosure provides a method for corrosion supervision of a gas pipeline. The method is implemented through a smart gas safety management platform of an Internet of Things (IoT) system for corrosion supervision of a gas pipeline. The method includes: obtaining inspection data of a gas pipeline in a gas pipeline network; constructing a first pipeline diagram of the gas pipeline network based on the inspection data; determining a corrosion probability of the gas pipeline based on the first pipeline diagram using a corrosion probability model, the corrosion probability model being a machine learning model; wherein the first pipeline diagram includes nodes and edges, the nodes in the first pipeline diagram include a first type of nodes corresponding to monitoring device installation points and a second type of nodes corresponding to pipeline demarcation points, features of the first type of nodes include the inspection data, features of the second type of nodes is null; and features of the edges in the first pipeline diagram include a gas flow direction, pipeline features, and an environmental unit feature sequence; determining one or more estimated pipeline corrosion regions based on the corrosion probability of the gas pipeline; obtaining in-depth inspection data of the gas pipeline by performing in-depth inspection on at least one of the estimated pipeline corrosion regions; determining corrosion features of the one or more estimated pipeline corrosion regions based on gas monitoring data and the in-depth inspection data of the gas pipeline; and determining a repair plan based on the one or more estimated pipeline corrosion regions and/or the corrosion features.

One of the embodiments of the present disclosure provides an Internet of Things (IoT) system for corrosion supervision of a gas pipeline. The IoT system includes a smart gas safety management platform. The smart gas safety management platform is configured to: obtain inspection data of a gas pipeline in a gas pipeline network; construct a first pipeline diagram of the gas pipeline network based on the inspection data; determine a corrosion probability of the gas pipeline based on the first pipeline diagram using a corrosion probability model, the corrosion probability model being a machine learning model; wherein the first pipeline diagram includes nodes and edges, the nodes in the first pipeline diagram include a first type of nodes corresponding to monitoring device installation points and a second type of nodes corresponding to pipeline demarcation points, features of the first type of nodes include the inspection data, features of the second type of nodes is null; and features of the edges in the first pipeline diagram include a gas flow direction, pipeline features, and an environmental unit feature sequence; determine one or more estimated pipeline corrosion regions based on the corrosion probability of the gas pipeline; obtain in-depth inspection data of the gas pipeline by performing in-depth inspection on at least one of the estimated pipeline corrosion regions; determine corrosion features of the one or more estimated pipeline corrosion regions based on gas monitoring data and the in-depth inspection data of the gas pipeline; and determine a repair plan based on the one or more estimated pipeline corrosion regions and/or the corrosion features.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
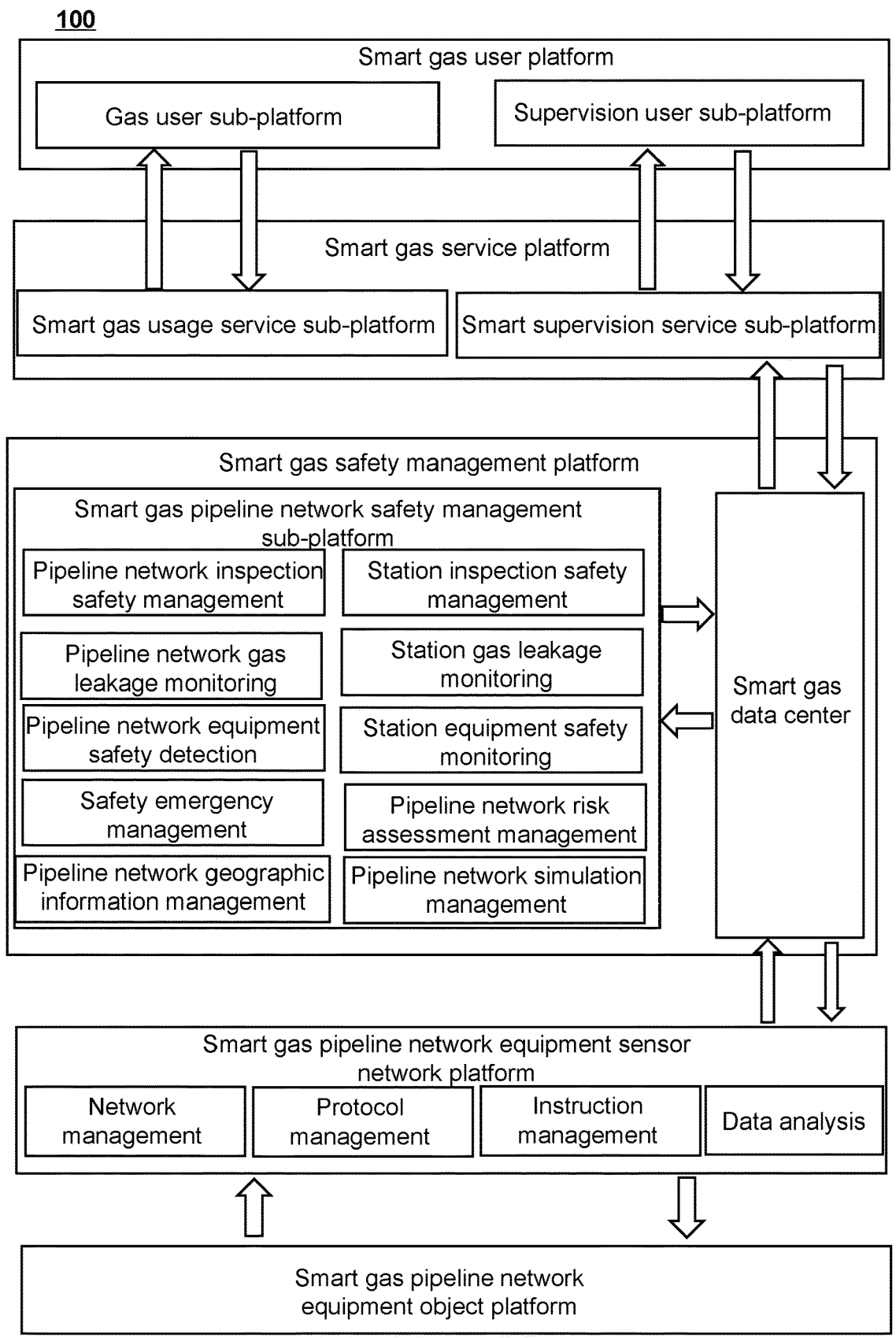
FIG. 1 is a schematic diagram illustrating an Internet of Things (IoT) system for corrosion protection optimization of a pipeline of smart gas according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Instead, various steps may be processed in reverse order or simultaneously. Meanwhile, other operations may be added to these procedures, or a certain step or steps may be removed from these procedures.

FIG. 1 is a schematic diagram illustrating an Internet of Things (IoT) system 100 for corrosion protection optimization of a pipeline of smart gas according to some embodiments of the present disclosure.

As shown in FIG. 1, the IoT system 100 may include a smart gas user platform, a smart gas service platform, a smart gas safety management platform, a smart gas pipeline network equipment sensor network platform, and a smart gas pipeline network equipment object platform.

In some embodiments, whether a gas pipeline is corroded and a corrosion situation may be determined by implementing the IoT system 100 for corrosion protection optimization of the pipeline of smart gas, and a repair plan for a corroded gas pipeline may be further determined.

The smart gas safety management platform refers to a platform that overall-plans and coordinates the connection and collaboration between various functional platforms, gathers all information of the IoT, and provides perceptional management and control management functions for an IoT operating system. The smart gas safety management platform may obtain information such as a corrosion situation of a pipe wall of the gas pipeline and a treatment plan for corrosion protection. In some embodiments, the smart gas safety management platform may be used to implement a method for corrosion protection optimization of a pipeline of smart gas. More details regarding the method for corrosion protection optimization of the pipeline of smart gas may be found in relevant descriptions in FIG. 1.

In some embodiments, the smart gas safety management platform may include a smart gas pipeline network safety management sub-platform and a smart gas data center. In some embodiments, the smart gas pipeline network safety management sub-platform may bi-directionally interact with the smart gas data center. The smart gas pipeline network safety management sub-platform may store, process, and/or transmit data, and may further summarize the processed data to the smart gas data center. The smart gas data center may analyze, process, and store the summarized data, and then upload the data to the smart gas service platform and send the data to the smart gas pipeline network equipment sensor network platform. In some embodiments, the smart gas safety management platform may transmit the corrosion situation and the repair plan to the smart gas data center; the smart gas data center may transmit the corrosion situation and the repair plan to the smart gas service platform; and the smart gas service platform may transmit the corrosion situation and the repair plan to the smart gas user platform.

In some embodiments, the smart gas pipeline network safety management sub-platform may include a plurality of safety management modules, such as a pipeline network inspection safety management module, a safety emergency management module, a pipeline network risk assessment management module, a pipeline network geographic information management module, a pipeline network equipment safety detection module, etc. The pipeline network inspection safety management module may consult inspection data of the pipeline network and abnormality information of the pipeline network, and provide data support for the safety emergency management module to formulate a safety emergency plan. The safety emergency management module may formulate an emergency response plan according to a safety risk of pipeline network equipment, such as a treatment plan for corrosion protection, etc.; the pipeline network risk assessment management module may conduct pipeline network safety risk assessment according to a preset model in combination with operation data and basic pipeline data of the pipeline network, and may carry out safety classification according to an assessment situation and perform three-dimensional visual management in terms of a geographic information system (GIS); the pipeline network geographic information management module may view geographic information of pipelines and equipment and attribute information thereof in real time, providing data support for field operation; and the pipeline network equipment safety detection module may consult historical safety data and current safety data of equipment operation in the smart gas pipeline network equipment object platform. In some embodiments, the smart gas pipeline network safety management sub-platform may further include a pipeline network gas leakage monitoring module, a station inspection safety management module, a station gas leakage monitoring module, a station equipment safety monitoring module, a pipeline network simulation management module, etc., which may be determined according to actual requirements.

In some embodiments, the smart gas safety management platform may interact downwards with the smart gas pipeline network equipment sensor network platform, send an instruction for obtaining the inspection data to the smart gas pipeline network equipment sensor network platform, and receive the inspection data of the gas pipeline uploaded by the smart gas pipeline network equipment sensor network platform. In some embodiments, the smart gas safety management platform may interact upwards with the smart gas service platform, receive a query instruction for obtaining the inspection data, or the like, sent by the smart gas service platform and upload data about the corrosion situation and the repair plan to the smart gas service platform.

The smart gas user platform may be a platform for interacting with a user. In some embodiments, the smart gas user platform may be configured as terminal equipment. For example, the terminal device may include a mobile device, a tablet computer, etc., or any combination thereof. In some embodiments, the smart gas user platform may be used to feed back information such as the corrosion situation and the repair plan of the pipe wall of the gas pipeline to the user.

In some embodiments, the smart gas user platform may include a gas user sub-platform and a supervision user sub-platform. The gas user sub-platform may be oriented to a gas user, and provide the inspection data, the repair plan, etc., to the gas user. The gas user refers to a user who uses gas. The supervision user sub-platform may be oriented to a supervision user, and supervise the operation of the entire IoT system for corrosion protection optimization of the gas pipeline. The supervision user refers to a user of a safety department.

In some embodiments, the gas user sub-platform may correspond to and interact with a smart gas usage service sub-platform. In some embodiments, the supervision user sub-platform may correspond to and interact with a smart supervision service sub-platform to obtain services required by safety supervision. In some embodiments, the smart gas user platform may perform bidirectional interaction with the smart gas service platform, send an instruction for obtaining the inspection data, or the like, to the smart gas service platform and receive the inspection data uploaded by the smart gas service platform.

The smart gas service platform may be a platform for receiving and transmitting data and/or information. The smart gas service platform may send the inspection data to the smart gas user platform.

In some embodiments, the smart gas service platform may include the smart gas usage service sub-platform and the smart supervision service sub-platform. The smart gas usage service sub-platform may correspond to the gas user sub-platform, providing services such as monitoring the corrosion situation of the pipe wall of the gas pipeline, or the like, to the gas user. The smart supervision service sub-platform may correspond to the supervision user sub-platform, providing services for safety supervision to the gas supervision user.

In some embodiments, the smart gas service platform may interact downwards with the smart gas safety management platform, send the instruction for obtaining the inspection data, or the like, to the smart gas data center and receive the inspection data uploaded by the smart gas data center. In some embodiments, the smart gas service platform may interact upwards with the smart gas user platform, receive the instruction for obtaining the inspection data, or the like, sent by the user platform, and upload the inspection data to the smart gas user platform.

The smart gas pipeline network equipment sensor network platform may be a functional platform for sensor communication management. The smart gas sensor network platform may be configured as a communication network and a gateway.

In some embodiments, the smart gas pipeline network equipment sensor network platform may include modules such as a network management module, a protocol management module, an instruction management module, and a data analysis module, to implement the aforementioned function of sensor communication management.

In some embodiments, the smart gas pipeline network equipment sensor network platform may interact downwards with the smart gas pipeline network equipment object platform, send the instruction for obtaining the inspection data to the smart gas pipeline network equipment object platform, and receive the inspection data uploaded by the smart gas pipeline network equipment object platform. The smart gas pipeline network equipment sensor network platform may interact upwards with the smart gas safety management platform, receive the instruction for obtaining the inspection data sent by the smart gas data center, and upload the inspection data to the smart gas data center.

The object platform of smart gas pipeline network equipment may be a functional platform for perceptional information generation and control information execution, and may include a monitoring device. In some embodiments, the smart gas pipeline network equipment object platform may be used to obtain the inspection data, and transmit the inspection data to the smart gas safety management platform through the smart gas pipeline network equipment sensor network platform.

The gas pipeline network equipment object platform may be configured as a variety of equipment, such as pipeline network equipment and monitoring equipment. The pipeline network equipment may include pressure regulation equipment, a gas gate station compressor, a gas flow meter, valve control equipment, a thermometer, a barometer, etc. The monitoring equipment may include an inspection robot, a crawling robot, a temperature sensor, and a pH value sensor, etc.

In some embodiments, the smart gas pipeline network equipment object platform may interact upwards with the smart gas pipeline network equipment sensor network platform, receive the instruction for obtaining the inspection data sent by the smart gas pipeline network equipment sensor network platform and upload the inspection data to the smart gas pipeline network equipment sensor network platform.

In some embodiments of the present disclosure, the corrosion situation of pipelines in each region may be determined using the data on gas monitoring through the modes, and the repair plan may be formulated for repairing the corrosion of the pipelines, so that business personnel may quickly respond to the corrosion situation of the pipelines and repair the pipelines in time, to ensure the normal transportation of gas.

Figure 2:
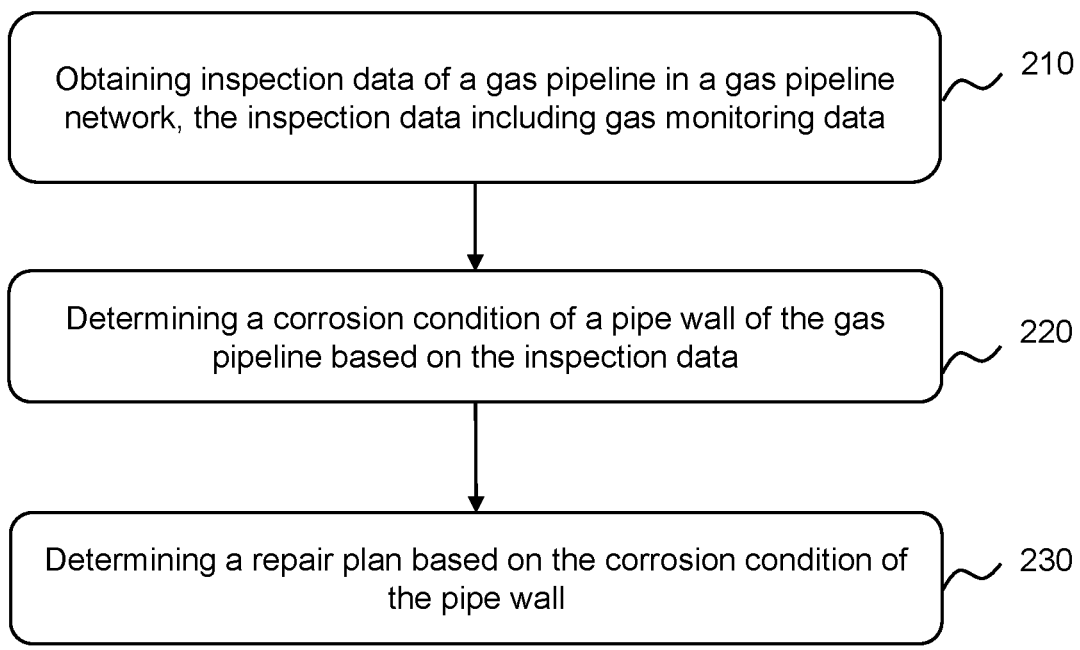
FIG. 2 is a flowchart illustrating an exemplary method for corrosion protection optimization of a pipeline of smart gas according to some embodiments of the present disclosure.

FIG. 2 is a flowchart illustrating an exemplary method for corrosion protection optimization of a pipeline of smart gas according to some embodiments of the present disclosure. In some embodiments, the process 200 may be performed by a smart gas safety management platform. The process 200 may include the following operations.

In 210, inspection data of a gas pipeline in a gas pipeline network may be obtained, the inspection data including gas monitoring data.

The inspection data may be data obtained after inspecting and monitoring the gas pipeline. In some embodiments, the inspection data may include gas monitoring data, in-depth detection data of a gas pipeline, or the like, of different points in the gas pipeline network. The points may include locations where the monitoring equipment is installed in the gas pipeline network.

The gas monitoring data refers to the data obtained by monitoring different points of the gas pipeline in the gas pipeline network. In some embodiments, the gas monitoring data may include a gas feature value corresponding to each point. The gas feature values may include temperature, an intensity of pressure, pressure, or the like. The temperature refers to temperature inside the different points of the gas pipeline in the gas pipeline network.

In some embodiments, the inspection data may further include in-depth inspection data of the gas pipeline. The in-depth detection data of the gas pipeline refers to gas pipeline feature data monitored by means of sensor detection and image recognition. More details regarding the in-depth inspection data of the gas pipeline may be found in other contents of the present disclosure (e.g., FIG. 3).

In some embodiments, the smart gas safety management platform may obtain inspection data of the gas pipeline. The smart gas safety management platform may monitor the gas feature values through gas monitoring devices at fixed points of the pipeline. In some embodiments, the gas monitoring devices may obtain the gas monitoring data by means of thickness detection and image recognition. Thickness detection may be used to obtain thickness detection data, and image recognition may be used to obtain image detection data. More details regarding the thickness detection data and the image detection data may be found in other contents of the present disclosure (e.g., FIG. 3).

In 220, a corrosion condition of a pipe wall of the gas pipeline may be determined based on the inspection data.

The corrosion situation of the pipe wall refers to the performance of a corroded pipeline. In some embodiments, the corrosion situation of the pipe wall may include a corrosion state, a corrosion type, or the like. The corrosion state may include whether corrosion occurs, a corroded region, a corrosion degree, or the like. For example, the corroded region may be an inner wall coating or an outer wall coating. The corrosion degree may include cracks, severe cracks, etc. The corrosion type may be corrosion caused by different substances, such as corrosion of an inner coating affected by natural gas, corrosion of an outer coating affected by soil, corrosion of both inner and outer coatings affected by thermal expansion and contraction of pipelines, corrosion affected by pressure, etc.

In some embodiments, the smart gas safety management platform may determine the corrosion situation of one or more points based on current monitoring data of the gas pipeline network, and then determine one or more corrosion regions. For example, a reference database may be constructed based on historical monitoring data and historical corrosion situations of the gas pipeline network. The reference database may include a plurality of reference vectors. Each reference vector may include at least features of a reference environment unit and the historical monitoring data of the gas pipeline network. Each reference vector may correspond to a historical corrosion situation. The features of the environmental unit of the current location of the gas pipeline network and the current monitoring data may be matched with the vectors in the reference database. A current corrosion situation may be estimated based on the historical corrosion situation corresponding to the reference vector with the highest similarity. In response to a determination of corrosion, a region estimated to have the corrosion may be determined as the corrosion region.

In some embodiments, the smart gas safety management platform may further construct a pipeline diagram according to the inspection data; determine a corrosion probability of each pipeline in the gas pipeline through a corrosion probability prediction model based on the inspection data pipeline diagram; determine an estimated corrosion region based on the corrosion probability of each pipeline; obtain in-depth detection data of the gas pipeline by performing thickness detection and image recognition on at least one estimated corrosion region; and determine corrosion features of one or more estimated corrosion regions based on the gas monitoring data and the in-depth detection data of the gas pipeline. More details regarding determining the corrosion situation according to the pipeline diagram may be found in other contents of the present disclosure (e.g., FIG. 3).

In 230, a repair plan may be determined based on the corrosion condition of the pipe wall.

The repair plan refers to a solution to the corrosion situation of the pipeline. In some embodiments, the repair plan may include a repair path or a repair substance. The repair path may be a pipeline that a repair robot passes through during repairing. Taking a pipeline diagram in FIG. 5 as an example, the repair path may be a route of node 1-node 2-node 3. The repair substance may be related to a type and an amount of a repair material. The type of the repair substance may be a corrosion protection coating, and the quantity of the repair substance may be the amount of the corrosion protection coating carried by the repair robot. More details regarding determining the repair plan may be found in FIG. 5 and related descriptions thereof in the present disclosure.

In some embodiments, the smart gas safety management platform may determine the repair plan of the pipeline based on the repair plans of pipeline nodes in similar environments. For example, the soil, temperature, and other environmental factors in the regions where node 1 and node 2 are located may be similar, and the repair plan of the node 2 may be determined using the repair plan of the node 1.

In some embodiments, the smart gas safety management platform may determine a repair operation based on the corrosion situation of the pipe wall. For example, in response to the corrosion situation of the inner wall of the gas pipeline satisfying a repair condition (e.g., the corrosion situation is second-level corrosion), the relevant gas pipelines may be coordinated to suspend work, to provide time for pipeline repair.

In some embodiments, the smart gas safety management platform may further control the repair robot to enter the pipeline in response to the corrosion situation of the pipe wall satisfying the first preset condition, and repair the pipeline according to the repair plan.

In some embodiments, the smart gas safety management platform may further generate a plurality of candidate repair paths according to a second preset condition, and determine a target repair path through a plurality of iterations. More details may be found in the relevant descriptions in FIG. 5 of the present disclosure.

According to the embodiment of the present disclosure, with the meticulous and clear platform division of the IoT system for corrosion protection optimization of the pipeline of smart gas, the corrosion situation of pipelines can be effectively grasped and controlled, and appropriate repair plans can be formulated according to the corrosion situation of pipelines, thereby improving the treatment and repair efficiency of pipeline corrosion problems and ensuring the safety of pipeline gas supply.

Figure 3:
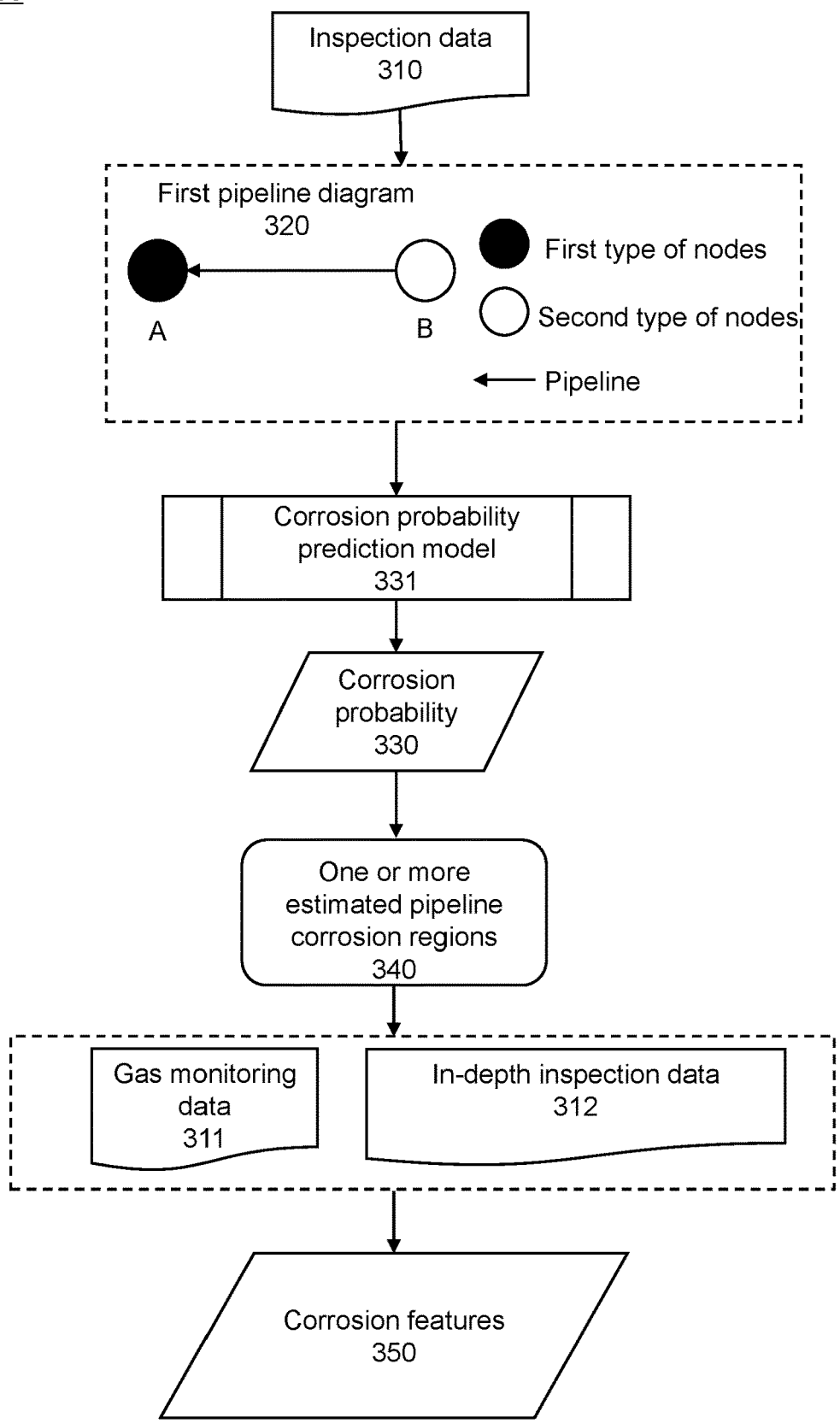
FIG. 3 is a schematic diagram illustrating a process for determining a corrosion situation of a pipe wall according to some embodiments of the present disclosure.

FIG. 3 is a schematic diagram illustrating a process for determining a corrosion situation of a pipe wall according to some embodiments of the present disclosure. As shown in FIG. 3, the process 300 may include the following contents.

In some embodiments, inspection data may further include in-depth detection data of the gas pipeline. As shown in FIG. 3, the determining the corrosion situation of the pipe wall based on the inspection data may include: constructing a first pipeline diagram 320 of the gas pipeline network based on the inspection data 310; determining a corrosion probability 330 of the gas pipeline based on the first pipeline diagram 320; determining one or more estimated pipeline corrosion regions 340 based on the corrosion probability 330 of the gas pipeline; obtaining the in-depth inspection data 312 of the gas pipeline by performing in-depth inspection on the at least one estimated pipeline corrosion region 340; and determining corrosion features 350 of the one or more estimated pipeline corrosion regions based on the gas monitoring data 311 and the in-depth detection data 312 of the gas pipeline.

The first pipeline diagram 320 refers to a schematic diagram of gas pipeline laying, which is used to represent the features, distribution, and environment of the gas pipeline. The first pipeline diagram 320 may include nodes and edges.

In some embodiments, the smart gas safety management platform may determine the nodes and the edges in the first pipeline diagram 320 based on the inspection data 310, and construct the first pipeline diagram 320 accordingly.

The nodes in the first pipeline diagram 320 may correspond to preset points of the gas pipeline. The preset points may include pipeline demarcation points (e.g., inflection points, etc.) or monitoring device installation points. The nodes in the first pipeline diagram 320 may include a first type of nodes corresponding to the monitoring device installation points and a second type of nodes corresponding to the pipeline demarcation points. As shown in FIG. 3, the first type of node A may be represented by a solid circle, and the second type of node B may be represented by a hollow circle. Features of the first type of nodes may include the inspection data, and features of the second type of nodes may be null.

The edges in the first pipeline diagram 320 may correspond to gas pipelines between the nodes. The gas pipelines refer to channels connecting the nodes. As shown in FIG. 3, an edge refers to a gas pipeline connecting the node A and the node B. The edges in the first pipeline diagram 320 may be determined according to drawings related to the structural design of the gas pipeline.

In some embodiments, the edges in the first pipeline diagram may be directed edges, and a direction of the directed edges may represent a gas flow direction. As shown in FIG. 3, a connecting line between the node A and the node B may be a directed edge, representing that the gas flows from the node B to the node A.

Edge features in the first pipeline diagram 320 may include a gas flow direction, pipeline features, and an environmental unit feature sequence. The pipeline features refers to features related to the properties of the gas pipeline. The pipeline features may include a length of a pipeline connecting two nodes, an inner diameter of a pipeline, a pipe wall material, etc. The environmental unit features refer to features of an environment where a unit pipeline between any two nodes is located. For example, any pipeline between any two nodes may be divided into several segments, one segment may be a unit pipeline, and the environmental unit features may include the environmental features of several segments of unit pipelines corresponding to the pipeline.

In some implementations, the environmental unit features may be represented by the environmental unit feature sequence. The environmental unit feature sequence may refer to a sequence composed of the environmental features of several segments of unit pipelines corresponding to the pipeline. For example, the environmental unit feature sequence may be $(C_{p1}, C_{p2}, C_{p3}, \ldots, C_{pn})$, representing that the corresponding pipeline may include n segments of unit pipelines, and the environmental features corresponding to the nth segment of unit pipeline may be an environmental feature vector $C_{pn}$. Each environment feature vector may include at least elements representing features such as temperature and humidity. In some embodiments, the elements in each environment feature vector may further include features determined according to the environment in which the gas pipeline is located. For example, if the outside of the gas pipeline is air, the elements in the environment feature vector may include features related to air conditions, such as air velocity, air pressure, etc. If the outside of the gas pipeline is soil, the elements in the environment feature vector may include features related to soil, such as soil density, soil pH, etc.

The corrosion probability 330 refers to a possibility of the gas pipeline being corroded. The corrosion probability 330 may be represented by a number within a range of 0-1. The higher the corrosion probability 330 is, the higher the possibility of the gas pipeline being corroded may be.

In some embodiments, the corrosion probability 330 may be determined by a corrosion probability prediction model 331.

In some embodiments, the smart gas safety management platform may determine the corrosion probability 330 through the corrosion probability prediction model 331. In some embodiments, the corrosion probability prediction model 331 may determine the corrosion probability 330 of the gas pipeline corresponding to each edge in the first pipeline diagram 320 by processing the first pipeline diagram 320. The corrosion probability prediction model 331 may be a machine learning model, such as a graph neural network model (GNN).

In some embodiments, an input of the corrosion probability prediction model 331 may be the first pipeline diagram 320, and an output of the corrosion probability prediction model 331 may be the corrosion probability 330 of each edge of the first pipeline diagram 320. In some embodiments, in the input of the corrosion probability prediction model 331, the node features in the first pipeline diagram 320 may be the gas monitoring data of each node.

In some embodiments, the corrosion probability prediction model 331 may be obtained through training. For example, a plurality of labeled training samples may be input into an initial corrosion probability prediction model, a loss function may be constructed based on labels and the corresponding output of the initial corrosion probability prediction model, and parameters of the initial corrosion probability prediction model may be iteratively updated based on the loss function until a preset condition is met and then the model training may be completed, wherein the preset condition may be that the loss function converges, the count of iterations reaches a threshold, or the like.

In some embodiments, the training samples may include a plurality of first sample pipeline diagrams, and the labels may be historical corrosion situations corresponding to the edges in the first sample pipeline diagrams. In some embodiments, the labels may be obtained by manual labeling.

The estimated pipeline corrosion regions 340 may generally refer to possible corrosion regions determined based on the current gas pipeline inspection data. For example, the estimated pipeline corrosion regions may include a region where the corrosion probability of the gas pipeline meets a corrosion threshold requirement. The corrosion threshold requirement may be that the corrosion probability is greater than a corrosion threshold. The corrosion threshold may be set manually. For example, if the corrosion probability of a gas pipeline A is 80%, the corrosion probability of a gas pipeline B is 30%, and the corrosion threshold is 50%, then the gas pipeline A may be the estimated pipeline corrosion region.

The in-depth inspection data 312 of the gas pipeline refers to data obtained by performing in-depth inspection on the estimated pipeline corrosion regions 340. In some embodiments, the in-depth inspection data 312 of the gas pipeline may include thickness inspection data, image inspection data, or the like. The thickness detection data refers to a thickness of the gas pipeline in the estimated pipeline corrosion regions. The image detection data refers to an image of the inside of the gas pipeline of the estimated pipeline corrosion regions.

In some embodiments, the thickness detection data may be obtained by a thickness detector. In some embodiments, the thickness detection data may be obtained by measuring a plurality of first preset positions of the gas pipeline from the outside of the gas pipeline by the thickness detector. The first preset positions may be manually set. The first preset positions may be determined based on endpoints of the aforementioned unit pipelines. For example, each first preset position may be any one of two endpoints of any unit pipeline.

In some embodiments, the image detection data may be obtained by a crawling robot. In some embodiments, the image detection data may be obtained by controlling the crawling robot to enter the pipeline to take images of a plurality of second preset positions on the inner walls of the estimated pipeline corrosion regions. The second preset positions may be manually set. The second preset positions may be determined according to the endpoints of the aforementioned unit pipelines. For example, each second preset position may be one of the two endpoints of any unit pipeline. The second preset positions may be the same as the first preset positions.

The corrosion features 350 refer to features of specific locations where corrosion occurs in the estimated pipeline corrosion regions. In some embodiments, the corrosion features 350 may include a corrosion type, a corrosion degree, or the like.

The corrosion type refers to a type of corrosion classified based on a damage situation of a pipe wall coating and an exposure situation of the pipe wall of the gas pipeline. For example, the corrosion type may include a first-level type and a second-level type. The corrosion corresponding to the second-level type may be more severe than that corresponding to the first-level type. For example, the coating in the corrosion region of the gas pipeline corresponding to the first-level type may have cracks or be partially missing, but the pipe wall may not be exposed or may be partially exposed, i.e., the pipe wall may not be corroded through, and the coating in the corrosion region of the gas pipeline corresponding to the second-level type may have a larger area of missing and the pipe wall may be exposed.

The corrosion degree refers to a corrosion degree to the gas pipeline. The corrosion degree may be expressed by a ratio of a corrosion area to an area of the entire gas pipeline. The corrosion degree may also be expressed by a ratio of a reduced thickness of the pipe wall where the corrosion occurs to a thickness before corrosion.

In some embodiments, the corrosion degree may be used to determine the amount of a corrosion protection coating carried by a repair robot. More details may be found in the relevant descriptions in FIG. 5 of the present disclosure.

In some embodiments, the corrosion degree may be used to determine a second evaluation value of a repair path. More details may be found in the relevant descriptions in FIG. 5 of the present disclosure.

In some embodiments, the smart gas safety management platform may preset a database, which includes at least one historical corrosion vector. Each historical corrosion vector may include historical gas monitoring data, historical in-depth inspection data of the gas pipeline, and historical corrosion features. A current corrosion vector corresponding to a current estimated pipeline corrosion region may be determined based on the gas monitoring data and the in-depth inspection data of the gas pipeline corresponding to the current estimated pipeline corrosion region. By comparing a similarity between the current corrosion vector and the historical corrosion vector, the historical corrosion features corresponding to the historical corrosion vector with the highest similarity may be used as the corrosion features 350 corresponding to the current corrosion vector.

In some embodiments, the estimated pipeline corrosion regions 340 may include a first estimated corrosion region and a second estimated corrosion region. In some embodiments, a process for determining the corrosion features 350 of the one or more estimated pipeline corrosion regions may include: determining a corrosion type and a corrosion degree of the first estimated corrosion region based on the in-depth detection data 312 of the first estimated corrosion region; and determining a corrosion type and a corrosion degree of the second estimated corrosion region through a corrosion feature prediction model based on a second pipeline diagram of the gas pipeline network.

The first estimated corrosion region refers to an estimated pipeline corrosion region that may be detected by an instrument to obtain the in-depth detection data. In some embodiments, the instrument may include a thickness gauge, a crawling robot, or the like.

In some embodiments, the processor may determine the corrosion features 350 of the first estimated corrosion region through a preset database. In some embodiments, the processor may determine the corrosion features of the first estimated corrosion region through a corrosion feature determination model.

In some embodiments, the smart gas safety management platform may determine the corrosion features of the first estimated corrosion region through the corrosion feature determination model. In some embodiments, an input of the corrosion feature determination model may include the gas monitoring data 311 of the first estimated corrosion region and the in-depth inspection data 312 of the gas pipeline, and an output of the corrosion feature determination model may include the corrosion type and the corrosion degree of the first estimated corrosion region. The corrosion feature determination model may be a machine learning model, such as a deep neural network model.

In some embodiments, the corrosion feature determination model may be obtained through training. For example, a plurality of labeled training samples may be input into an initial corrosion feature determination model, a loss function may be constructed based on labels and a corresponding output of the initial corrosion feature determination model, and parameters of the initial corrosion feature determination model may be iteratively updated based on the loss function until a preset condition is met, and then the model training may be completed, wherein the preset condition may be that the loss function converges, the count of iterations reaches a threshold, or the like.

In some embodiments, the training samples may include a plurality of training data, each training data may include historical gas monitoring data and historical gas pipeline in-depth inspection data of a first sample corrosion region, and the labels may be corresponding corrosion features. In some embodiments, the labels may be obtained by manual labeling.

The second estimated corrosion region refers to an estimated pipeline corrosion region that fails to be detected by the instrument to obtain the in-depth inspection data of the gas pipeline. For example, the part of the gas pipeline corresponding to the second estimated corrosion region may be relatively narrow and difficult to pass through, and the crawling robot may not be suitable for entering the part of the gas pipeline corresponding to the second estimated corrosion region. As another example, an air pressure and temperature of the gas pipeline part corresponding to the second estimated corrosion region may be relatively high, and the crawling robot may not be suitable for entering the part of the gas pipeline corresponding to the second estimated corrosion region. As another example, the part of the gas pipeline corresponding to the second estimated corrosion region may be deeply buried, and thickness detection may not be carried out using a thickness detector. All of the above situations may lead to the failure to obtain the in-depth inspection data of the gas pipeline. In some embodiments, the first corrosion region and the second estimated corrosion region may be on the same gas pipeline.

When the gas pipeline in-depth detection data of the estimated pipeline corrosion region fails to be obtained, the processor may predict the corrosion features of the second estimated corrosion region through the corrosion feature prediction model based on a second pipeline diagram. More details regarding the second pipeline diagram and the corrosion feature prediction model may be found in the relevant descriptions in FIG. 4 of the present disclosure.

In some cases, movable detection instruments (e.g., robots) may be high in cost or less in number, or the detection instruments may not be accessible or convenient to enter for a part of regions where the gas pipelines are located. According to some embodiments of the present disclosure, after the estimated pipeline corrosion region with a high corrosion probability is determined based on the current inspection data, the scope of detection may be reduced, and then the detection instrument may be controlled to enter the environment where the estimated pipeline corrosion region is located for detection.

According to some embodiments of the present disclosure, the corrosion features of the second estimated corrosion region that is difficult to measure may be predicted based on inspection data of detectable gas pipelines through the second pipeline diagram, reducing the use and the use region of the instruments during detection, and reducing the difficulty of the detection. The accuracy of predicted corrosion features can be improved by using the corrosion feature determination model.

Figure 4:
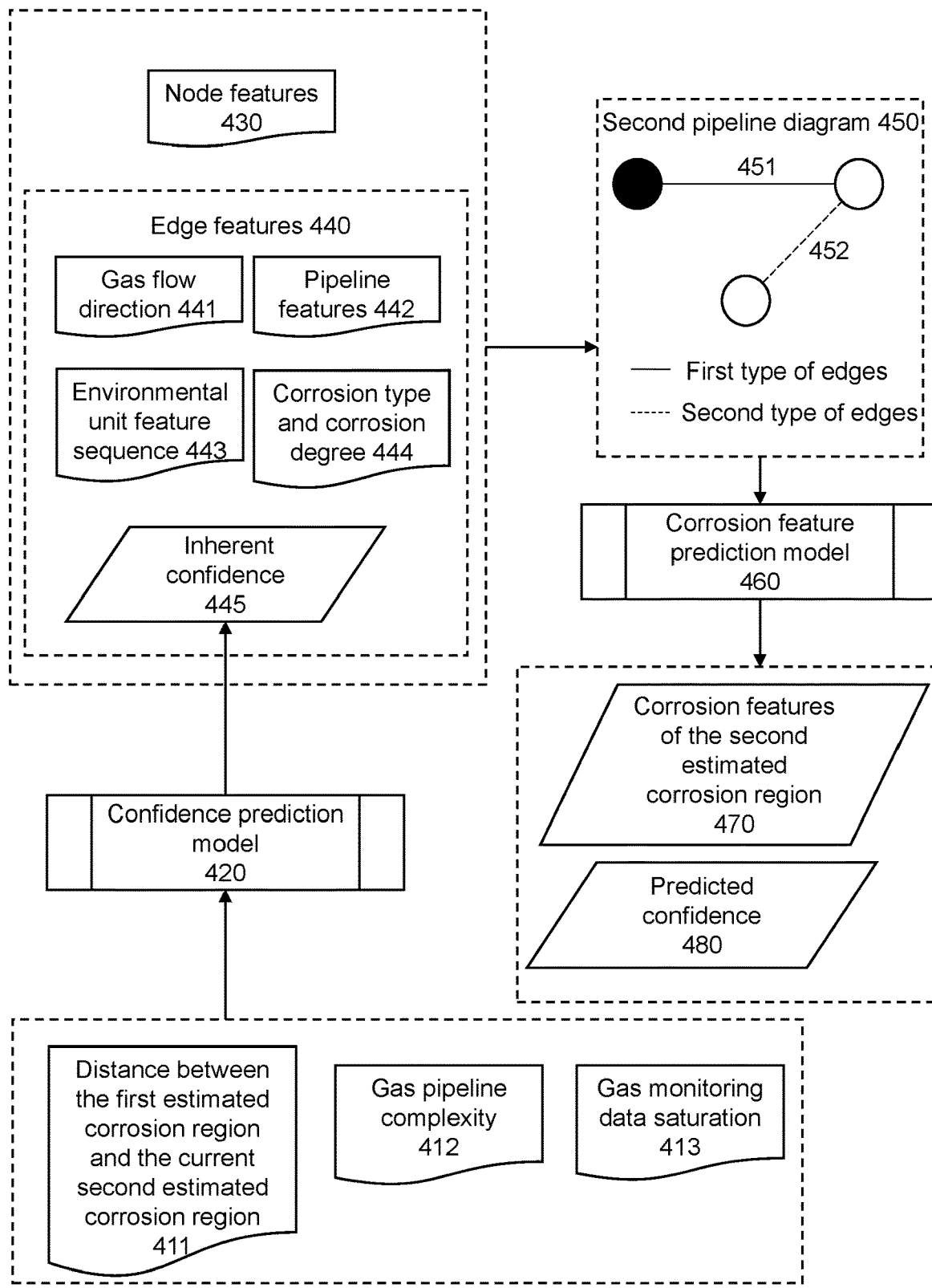
FIG. 4 is a schematic diagram illustrating a process for determining corrosion features of a second estimated corrosion region according to some embodiments of the present disclosure.

FIG. 4 is a schematic diagram illustrating a process for determining corrosion features of a second estimated corrosion region according to some embodiments of the present disclosure. As shown in FIG. 4, the process 400 may include the following operations.

In some embodiments, the smart gas safety management platform may determine corrosion features of a second estimated corrosion region through a corrosion feature prediction model based on a second pipeline diagram 450.

The second pipeline diagram 450 may include nodes and edges. The nodes may reflect locations where gas monitoring devices are installed (e.g., solid nodes in the second pipeline diagram 450) and/or locations where gas monitoring devices are not installed (e.g., hollow nodes in the second pipeline diagram 450), and the edges may reflect the gas pipelines. Node features may include at least the monitoring data of the gas monitoring devices. Edge features may include at least gas flow directions of the gas pipelines, pipeline features, environmental features, and a corrosion type and a corrosion degree of the first estimated corrosion region.

As shown in FIG. 4, the smart gas safety management platform may determine node features 430 and edge features 440 corresponding to the second pipeline diagram 450 through the inspection data, and construct the second pipeline diagram 450 accordingly.

The nodes in the second pipeline diagram 450 may correspond to preset points of the gas pipeline. The preset points may include pipeline demarcation points (e.g., inflection points, etc.) or monitoring device installation points. The nodes in the second pipeline diagram 450 may include a first type of nodes corresponding to the monitoring device installation points and a second type of nodes corresponding to the pipeline demarcation points. As shown in FIG. 4, solid circles may represent the first type of nodes, and hollow circles may represent the second type of nodes. In some embodiments, when the pipeline diagram is determined for a same region, the nodes in the second pipeline diagram of the region may be the same as the nodes in the first pipeline diagram of the region.

The edges in the second pipeline diagram 450 may correspond to the gas pipelines between the nodes. In some embodiments, when the pipeline diagram is determined for the same region, the count and the location of the edges in the second pipeline diagram 450 of the region may be the same as the count and the location of edges in the first pipeline diagram of the region. In some embodiments, the edge features 440 corresponding to the second pipeline diagram may include a gas flow direction 441, pipeline features 442, an environmental unit feature sequence 443, and a corrosion type and corrosion degree 444. The corrosion type and corrosion degree 444 may be the corrosion type and the corrosion degree corresponding to the first estimated corrosion region. More details regarding the gas flow direction 441, the pipeline features 442, and the environmental unit feature sequence 443 may be found in the descriptions of the first pipeline diagram. In some embodiments, the edges in the second pipeline diagram 450 may include a first type of edges and a second type of edges. The first type of edges may be represented by solid lines, which may represent the gas pipelines of the first estimated corrosion region, such as edge 451 in FIG. 4. The second type of edges may be represented by dotted lines, which may represent the gas pipelines of the second estimated corrosion region, such as edge 452 in FIG. 4.

In some embodiments, the edge features in the second pipeline diagram 450 may further include an inherent confidence 445 of the gas pipeline. The inherent confidence 445 may be determined based on a confidence prediction model 420. The corrosion feature prediction model 460 may be further used to update the inherent confidence to obtain a predicted confidence 480 for the second estimated corrosion region.

The inherent confidence 445 refers to a possibility of corrosion features of a target gas pipeline predicted according to corrosion situations of other gas pipelines in the gas pipeline network. In some embodiments, the inherent confidence 445 refers to a possibility that the corrosion features of the second estimated corrosion region may be determined based on the corrosion features of the first estimated corrosion region. When the inherent confidence is high, it may represent that the possibility of determining the corrosion features of the second estimated corrosion region based on the corrosion features of the first estimated corrosion region is high, and a reliability of the predicted corrosion features of the second estimated corrosion region is high.

In some embodiments, the inherent confidence 445 may be related to a distance between the first estimated corrosion region and the current second estimated corrosion region 411, a gas pipeline complexity 412, or the like.

The distance between the first estimated corrosion region and the current second estimated corrosion region 411 refers to a sum of distances through the pipelines from the center of the first estimated corrosion region to the center of the second estimated corrosion region. For example, if the distance from the center of the first estimated corrosion region to a node A is 1 m, and the distance from node A to the center of the current second estimated corrosion region is 2 m, then the distance between the first estimated corrosion region and the current second estimated corrosion region is 3 m. When the distance between the first estimated corrosion region and the current second estimated corrosion region 411 is long, it may represent that the corrosion features of the first estimated corrosion region may hardly affect the current second estimated corrosion region, and the inherent confidence may be low.

The gas pipeline complexity 412 may be determined based on the count of edges, a count of nodes, and an average count of branches per node of the gas pipeline network. For example, the gas pipeline complexity may be positively correlated with the count of edges, the count of nodes, and the average count of branches per node of the gas pipeline network. In some embodiments, when the gas pipeline complexity 412 is high, the inherent confidence may be low.

In some embodiments, the smart gas safety management platform may determine the inherent confidence 445 through the confidence prediction model 420. In some embodiments, an input of the confidence prediction model 420 may be the distance between the first estimated corrosion region and the current second estimated corrosion region 411 and the gas pipeline complexity 412, and an output of the confidence prediction model 420 may be the inherent confidence 445. The confidence prediction model 420 may be a machine learning model, such as a deep neural network model.

In some embodiments, the confidence prediction model 420 may determine the inherent confidence based on the distance between at least one first estimated corrosion region and the current second estimated corrosion region. The distance between the first estimated corrosion region and the current second estimated corrosion region 411 may be represented by a vector. For example, a vector (D1, D2, D3, D4) may represent the distance between four different first estimated corrosion regions and the current second estimated corrosion region.

In some embodiments, the confidence prediction model 420 may be obtained through training. For example, a plurality of labeled training samples may be input into an initial confidence prediction model, a loss function may be constructed based on labels and corresponding outputs of the initial confidence prediction model, and parameters of the initial confidence prediction model may be iteratively updated based on the loss function until a preset condition is met, and the model training may be completed, wherein the preset condition may be that the loss function converges, the count of iterations reaches a threshold, or the like.

In some embodiments, the training sample may include a distance between at least one sample first estimated corrosion region and historical second estimated corrosion regions and historical gas pipeline complexities, and the labels may be whether the historical second estimated corrosion regions have corrosion. If there is corrosion, it may be marked as 1, and if there is no corrosion, it may be marked as 0. The training samples may be determined based on historical data. In some embodiments, the labels may be obtained by manual labeling.

In some embodiments of the present disclosure, the inherent confidence may be determined by the confidence prediction model, which can reflect the accuracy of predicting whether there is corrosion in the second estimated corrosion region through the first estimated corrosion region, further accurately determining the possibility of corrosion in the second estimated corrosion region, and determining a more appropriate repair plan.

In some embodiments, the input of the confidence prediction model 420 may further include a gas monitoring data saturation 413. The gas monitoring data saturation may be determined based on a count of gas monitoring nodes and a degree of dispersion of the gas monitoring nodes in the gas pipeline network.

The gas monitoring data saturation 413 refers to a saturation degree of a data volume of the gas monitoring data. The larger the data volume of the gas monitoring data is, the higher the gas monitoring data saturation may be, and the higher the corresponding inherent confidence may be.

The degree of dispersion of the gas monitoring nodes in the gas pipeline network refers to a distribution range of the gas monitoring nodes (i.e., the first type of nodes) in the gas pipeline network. The higher the degree of dispersion of the gas monitoring nodes in the gas pipeline network is, the greater the count of the gas monitoring nodes may be, representing that the gas monitoring data may not be collected centrally for a certain part of the gas pipeline network, and the higher the corresponding saturation may be.

In some embodiments of the present disclosure, the gas monitoring data saturation may be used as the input of the confidence prediction model, and the gas monitoring data and the count of gas monitoring nodes may be fully considered, which can be conducive to obtaining more accurate confidence prediction results and improving the accuracy of the model.

In some embodiments, the smart gas safety management platform may determine the corrosion features of the second estimated corrosion region 470 through the corrosion feature prediction model 460. In some embodiments, the corrosion feature prediction model 460 may determine the corrosion features of the second estimated corrosion region 470 by processing the second pipeline diagram 450. The corrosion feature prediction model may be a machine learning model, such as a graph neural network model.

In some embodiments, an input of the corrosion feature prediction model 460 may be the second pipeline diagram 450, and an output of the corrosion feature prediction model may be the corrosion features of the second estimated corrosion region 470, including the corrosion type and the corrosion degree. According to the foregoing descriptions, the second pipeline diagram 450 may include the node features 430 and the edge features 440. The edge features 440 may include the corrosion type and corrosion degree 444. The features may be set according to the actual situation for the first type of edges, and the features may be set to a preset value (e.g., 0) for the second type of edges. Then the corrosion type of the second type of edges may be updated based on a prediction result of the corrosion feature prediction model.

In some embodiments, the corrosion feature prediction model 460 may be obtained through training based on an initial corrosion feature prediction model and a plurality of labeled training samples. More details regarding the process method may be found in the training of the aforementioned confidence prediction model.

In some embodiments, the training samples may include a plurality of second sample pipeline diagrams, and the labels may be historical corrosion types and historical corrosion degrees of the second sample corrosion regions in the second sample pipeline diagrams. In some embodiments, the labels may be obtained by manual labeling.

The predicted confidence 480 refers to a confidence obtained by predicting the second estimated corrosion region.

In some embodiments, when the edge features in the second pipeline diagram further include the inherent confidence 445 of the second estimated corrosion region, the input of the corrosion feature prediction model 460 may include the inherent confidence 445, and the output of the corrosion feature prediction model 460 may include the predicted confidence 480.

Correspondingly, the training samples of the corrosion feature prediction model 460 may further include historical inherent confidences of the second estimated corrosion region, and the corresponding labels may include whether there is corrosion in the second estimated corrosion region. If there is corrosion, the label may be marked as 1, and if there is no corrosion, the label may be marked as 0.

In some embodiments, the predicted confidence may be used to determine the amount of corrosion protection coating carried by the repair robot. More details may be found in the relevant descriptions in FIG. 5.

In some embodiments, the predicted confidence may be used to determine a third evaluation value of a repair path. More details may be found in the relevant descriptions in FIG. 5.

In some embodiments of the present disclosure, the second pipeline diagram may be processed through the corrosion feature prediction model, the connection between the nodes and the edges may be considered and the change of the node features may be accurately analyzed, thus making the prediction result more accurate. Meanwhile, determining the corrosion features of the second estimated corrosion region through the corrosion feature prediction can increase the generality of the model, and make the model suitable for scenarios where the corrosion situation of the region fails to be detected. Further, the predicted confidence synchronously output by the model can reflect the estimation of the accuracy of model prediction, which is helpful for decision makers to make further judgment.

Figure 5:
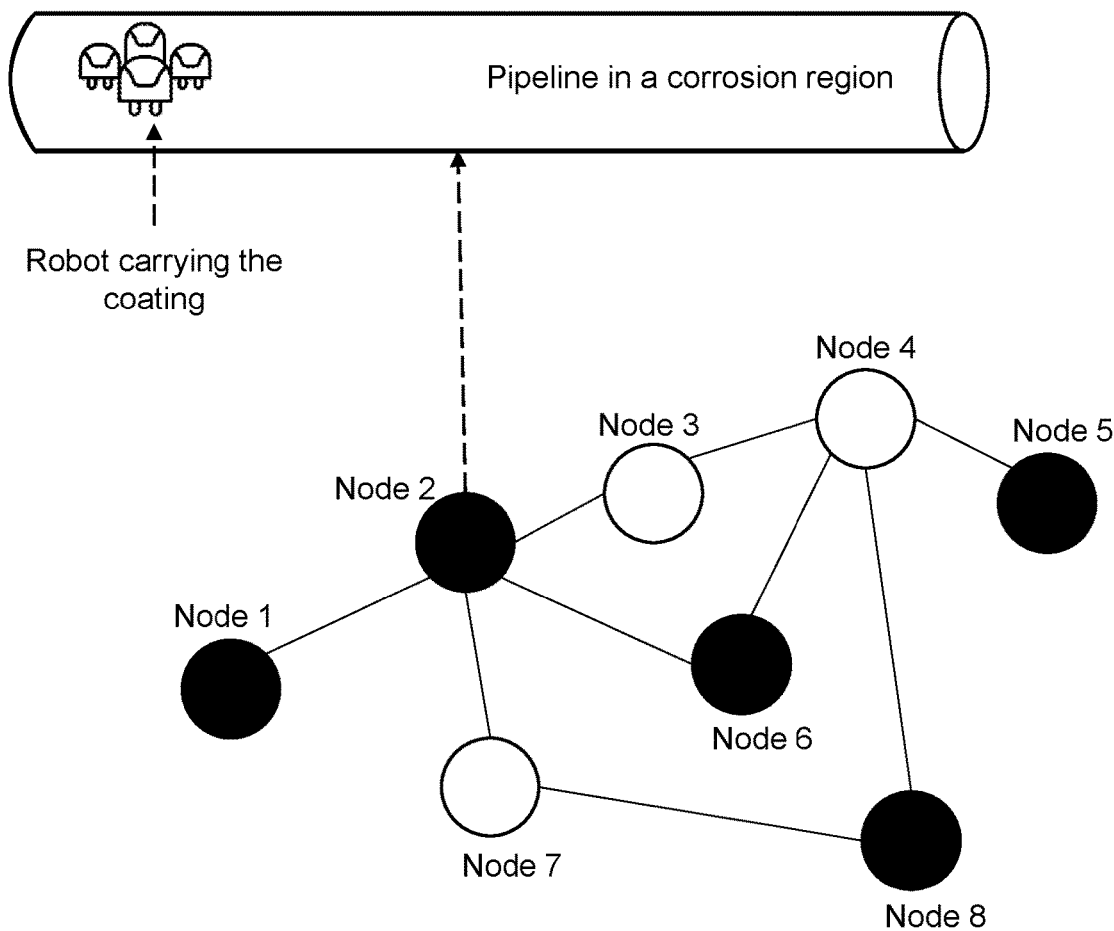
FIG. 5 is a schematic diagram illustrating a process for determining a repair plan according to some embodiments of the present disclosure.

FIG. 5 is a schematic diagram illustrating a process for determining a repair plan according to some embodiments of the present disclosure.

In some embodiments, determining a pipeline repair plan based on a corrosion situation of a pipe wall may include: in response to the corrosion situation of the pipe wall satisfying a first preset condition, controlling a repair robot to enter the gas pipeline, and repair the gas pipeline according to the repair plan.

The first preset condition refers to a preset minimum corrosion situation of a pipe wall that needs to be repaired. In some embodiments, the first preset condition refers to a condition set for corrosion features. In some embodiments, the first preset condition refers to a preset corrosion type and a minimum corrosion degree corresponding to the pipe wall that needs to be repaired. In some embodiments, the first preset condition may include that the corrosion type is second-level corrosion, and the corresponding minimum corrosion degree is 80%.

Satisfying the first preset condition may represent that the corrosion condition is greater than or equal to the first preset condition. For example, if the first preset condition includes that the corrosion type is the second-level corrosion, and the corresponding minimum corrosion degree is 80%, then the first preset condition may be satisfied when the corrosion type of the pipe wall is the second-level corrosion, and the corrosion degree is 90%.

In some embodiments, the corrosion situation of the pipeline may include a corrosion type and a corrosion degree of the pipeline. The corrosion type and the corrosion degree of the pipeline may be determined through a corrosion feature prediction model. More details regarding the corrosion feature prediction model may be found the related descriptions in FIG. 4.

As shown in FIG. 5, a repair process 500 may include that a robot carrying coating repairs a pipeline through different nodes in the pipeline in a corrosion region according to a repair path. The robot carrying the coating may be a repair robot. The repair robot refers to a machine capable of repairing an estimated pipeline corrosion region. In some embodiments, the repair robot may carry the coating. In some embodiments, the repair robot may move in the pipeline according to a set repair path.

The repair plan refers to a plan for repairing the gas pipeline. The repair plan may include the amount of corrosion protection coating carried by the repair robot, and the repair path of the repair robot.

In some embodiments, the amount of corrosion protection coating carried by the repair robot may be related to a count and a corrosion degree of the estimated pipeline corrosion regions.

In some embodiments, the larger the count of estimated pipeline corrosion regions is and the greater the corrosion degree of the corrosion region is, the greater the amount of corrosion protection coating carried by the repair robot may be.

In some embodiments, the amount of coating carried by the repair robot may also be related to a predicted confidence output of the corrosion feature prediction model.

In some embodiments, the lower the predicted confidence is, the lower the reliability of predicted corrosion features of a second estimated corrosion region may be. In order to enable the repair robot to carry a sufficient amount of coating during repair, the amount of coating carried by the repair robot may be appropriately increased. More details regarding the corrosion feature prediction model and the predicted confidence may be found in elsewhere in the present disclosure (e.g., the descriptions in FIG. 4).

In some embodiments of the present disclosure, the amount of corrosion protection coating carried by the robot may be determined based on the predicted confidence output by the corrosion feature prediction model, which avoids the waste caused by too much coating carried by the robot, reduces the cost of the robot repairing the pipeline, and avoids the problem that the robot carries too little coating and needs to perform a plurality of repairs, thereby improving the repair efficiency.

According to the embodiments of the present disclosure, the repair robot may be enabled to prepare sufficient coating, which can improve the repair efficiency, and prevent the repair progress from being hindered due to insufficient coating.

In some embodiments, the repair plan may include the repair path of the repair robot. The method for corrosion protection optimization of the pipeline of smart gas may further include: generating a plurality of candidate repair paths based on a second preset condition, and determining a target repair path through a plurality of iterations.

The repair path refers to a moving route of the repair robot when performing the repair. In some embodiments, route planning may include: generating the plurality of candidate repair paths, and determining the target repair path through the plurality of iterations.

The second preset condition refers to a condition that the candidate repair paths need to satisfy. In some embodiments, the second preset condition may be that the candidate repair paths are less than or equal to a preset maximum path length. The preset maximum path length may be manually set.

The candidate repair paths refer to a plurality of paths randomly generated according to the second preset condition. The candidate repair paths may generally include pipelines and paths between the pipelines that at least partially satisfy the first preset condition.

In some embodiments, the smart gas safety management platform may construct a schematic diagram of a gas pipeline network, and determine the candidate repair paths based on the schematic diagram of the gas pipeline network. In some embodiments, the schematic diagram of the gas pipeline network may be constructed according to a topological structure of the gas pipelines, at least including a connection relationship between the gas pipelines.

In some embodiments, the smart gas safety management platform may divide each gas pipeline into a plurality of segments based on a preset pipeline segmentation rule, and determine whether there is corrosion in the gas pipeline and corrosion features thereof based on a prediction result of the corrosion feature prediction model. The preset pipeline segmentation rule may be performing segmentation based on a fixed pipeline length. For example, every 5 meters of pipeline may be divided into a segment.

In some embodiments, the schematic diagram of the gas pipeline network may be determined based on a second pipeline diagram. For example, the corrosion type and the corrosion degree output by the corrosion feature model may be updated as edge features to the second pipeline diagram to obtain an updated second pipeline diagram, and the updated second pipeline diagram may be used as the schematic diagram of the gas pipeline network.

In some embodiments, the smart gas safety management platform may randomly generate a plurality of paths based on the schematic diagram of the gas pipeline network according to the preset maximum path length, each path being less than or equal to the maximum path length, and use the randomly generated paths as the candidate repair paths.

In some embodiments, the target repair path may be determined through a plurality of iterations based on the plurality of candidate repair paths.

In some embodiments, in each iteration, the smart gas safety management platform may screen the aforementioned plurality of candidate repair paths based on evaluation values to obtain selected candidate repair paths. For example, for each of the candidate repair paths, the smart gas safety management platform may calculate a corresponding evaluation value, and use the candidate repair paths whose evaluation values are greater than a preset threshold as the selected candidate repair paths. The preset threshold may be manually determined according to actual requirements.

In some embodiments, the evaluation values may include at least a first evaluation value and a second evaluation value. In some embodiments, the evaluation values may further include a third evaluation value. More details regarding the evaluation values may be found in the related descriptions below in the present disclosure.

In some embodiments, for the selected candidate repair paths, an iterated candidate repair path may be generated based on a current path in each iteration. In some embodiments, for each selected candidate repair path, a sub-path in the current path may be selected. The sub-path may include a sub-start point and a sub-end point, and the sub-path may be replaced with another path with the same sub-start point and the sub-end point to obtain the iterated candidate repair path. For example, if a current candidate repair path A includes a node 1, a node 2, a node 3, a node 4, and a node 5, the candidate repair path A may be expressed according to an order of nodes passed in the candidate repair path as: node 1→node 2→node 3→node 4→node 5, with a sub-path of "node 2→node 3→node 4" as the current sub-path. Other paths with the same sub-start point and sub-end point as the current sub-path may also include two other paths of "node 2→node 6→node 4" and "node 2→node 7→node 8→node 4", then one of the two other paths may be randomly selected to replace the sub-path in path A, and two iterated candidate repair paths may be obtained as "node 1→node 2→node 6→node 4→node 5" and "node 1→node 2→node 7→node 8→node 4→node 5".

In some embodiments of the present disclosure, the smart gas safety management platform may generate the iterated candidate repair paths by changing the nodes passed by the sub-paths in the selected candidate repair plans, which can improve the efficiency of determining the target repair path.

In some embodiments, the smart gas safety management platform may determine the candidate repair paths for a next iteration from the candidate repair paths or the selected candidate repair paths based on an order of the evaluation values. For example, the candidate repair paths or the selected candidate repair paths whose the evaluation values are greater than the preset threshold may be used as candidate repair paths for the next iteration, or the evaluation values may be sorted in a descending order, and the candidate repair paths with top ranked evaluation values may be determined as the candidate repair paths for the next iteration. The iterated candidate repair paths may be determined through the plurality of iterations. In some embodiments, conditions for an end of the iteration may include at least one of a count of iteration reaching a preset threshold of times, evaluation parameters reaching a preset parameter threshold, and a difference between the evaluation parameters of two consecutive iterations less than a preset difference threshold. The preset condition may be preset by a user.

In some embodiments, the smart gas safety management platform may determine the target repair path based on the evaluation value of each iterated candidate repair path. For example, the candidate repair path corresponding to an optimal evaluation value may be determined as the target repair path of the repair robot based on the evaluation value of the each candidate repair path. The evaluation values of the candidate repair paths may represent comprehensive performance of the candidate repair paths, such as a comprehensive evaluation value of repair cost, repair efficiency, etc.

In some embodiments, the candidate repair path with a relatively high evaluation value may be preferentially selected as the target repair path. In some embodiments, the evaluation values of the candidate repair paths may include a first evaluation value and a second evaluation value.

The first evaluation value refers to an evaluation value of the candidate repair path determined based on an invalid path. The invalid path refers to a path corresponding to a pipeline that the repair robot passes through but does not need to be repaired with the coating. In some embodiments, the first evaluation value may be related to an invalid path length. In some embodiments, the first evaluation value may be negatively related to the invalid path length. For example, the shorter the invalid path length is, the higher the corresponding first evaluation value may be. In some embodiments, the first evaluation value may be determined by a formula (1):

$$\alpha = k \cdot \beta^n \quad (1)$$

where, $\alpha$ is the first evaluation value, $\beta$ is the invalid path length, k and n are coefficients, which may be determined according to actual requirements, for example, k=1, n=−1.

The second evaluation value refers to an evaluation value of a candidate repair path determined based on a corrosion region passed in the path. In some embodiments, the second evaluation value may be related to the corrosion region. In some embodiments, the higher the corrosion degree of the corrosion region passed in the candidate repair path is, the higher the evaluation value of the candidate repair path may be. In some embodiments, the second evaluation value may be equal to a sum of the corrosion degrees of the corrosion regions covered by the candidate repair paths. More details regarding the corrosion degree may be found elsewhere in the present disclosure (e.g., the descriptions in FIG. 3).

In some embodiments, in response to that the corrosion degrees in the second evaluation value are summed up, weighting may be performed based on a distance from a gas source.

The second evaluation value refers to data representing an repair efficiency of each candidate repair path. For example, the higher the corrosion degree of the pipeline repaired based on a certain candidate repair path is, the higher the repair efficiency corresponding to the candidate repair path may be. The corrosion degree of the pipeline repaired in the candidate repair path may be the sum of the corrosion degrees of repairable pipelines in the candidate repair path. For example, repairable pipelines in a candidate repair path A may include a gas pipeline 1 and a gas pipeline 2, and corresponding corrosion degrees may be 0.5 and 0.6, respectively; repairable pipelines in a candidate repair path B may include a gas pipeline 3 and a gas pipeline 4, and corresponding corrosion degrees may be 0.2 and 0.4, respectively, then the corrosion degree of the pipeline repaired in the candidate repair path A may be 1.1, and the corrosion degree of the pipeline repaired in the candidate repair path B may be 0.6, and the repair efficiency corresponding to the candidate repair path A may be higher. In some embodiments, the second evaluation value may be determined based on a weighted sum of the corrosion degrees of the corrosion regions covered by the candidate repair path based on a weight determined by the distance from the gas source.

In some embodiments, in response to that the second evaluation value is calculated based on the sum of the corrosion degrees in the second evaluation value, the candidate repair path may be divided into a plurality of sub-paths, a weight of each sub-path may be determined based on the distance from the gas source of the each sub-path, and the second evaluation value may be determined based on the weight of each sub-path and the corrosion degree of the repaired gas pipeline corresponding to the each sub-path. For example, the candidate repair paths may include a gas pipeline 1 and a gas pipeline 2, the corresponding corrosion degrees may be 0.5 and 0.6, the corresponding weights may be 0.9 and 0.1, respectively, and then the second evaluation value may be 0.51 (0.5*0.9+0.6*0.1).

The distance from the gas source of the sub-path may refer to a distance from a gas source point to the corrosion region corresponding to the current sub-path. When the distance from the gas source of the sub-path is shorter, i.e., the distance is closer to the gas source, there may be a faster flow rate of gas, a higher temperature, and a higher transmission pressure in the corresponding gas pipeline of the sub-path. Thus the shorter the distance from the gas source of the sub-path, the greater the pressure the pipeline corresponding to the sub-path, the more problems may occur, and the lower the corresponding weight may be.

In some embodiments of the present disclosure, weighting may be performed based on the distance from the gas source, and the safety of the repair robot during operation can be better ensured by considering the impact of the distance from the gas source on the operation safety.

In some embodiments, the smart gas safety management platform may determine the evaluation value of each candidate path based on the first evaluation value and the second evaluation value. For example, the evaluation value of the each candidate path may be determined based on a weighted sum of the first evaluation value and the second evaluation value, and the weight may be manually determined based on actual requirements.

In some embodiments, the evaluation values of the candidate restoration paths may further include a third evaluation value. The third evaluation value may be obtained based on a predicted confidence output of the corrosion feature prediction model. More details regarding the predicted confidence may be found elsewhere in the present disclosure (e.g., the descriptions in FIG. 4).

The third evaluation value refers to an evaluation value of the candidate restoration path determined based on the predicted confidence.

In some embodiments, the third evaluation value may be equal to the predicted confidence.

In some embodiments, the smart gas safety management platform may determine the evaluation value of the each candidate path based on the first evaluation value, the second evaluation value, and the third evaluation value. For example, the evaluation value of the each candidate path may be determined based on a weighted sum of the first evaluation value, the second evaluation value, and the third evaluation value, and the weight may be manually determined based on actual requirements.

The corrosion situation of the pipeline may be quickly grasped through the predicted confidence output by the corrosion feature prediction model. The more serious the pipeline corrosion is, the higher the priority of the path passing through the pipeline. This manner can improve the efficiency of pipeline repair.

In some embodiments of the present disclosure, the greater the evaluation value of the candidate repair path is, the higher the processing priority may be, so that the repair plan may be enabled to fully consider a degree of urgent repair caused by the corrosion situation of the pipe wall of the gas pipeline, and the repair path of the repair plan can be optimized.

In some embodiments of the present disclosure, energy consumption can be saved while improving the repair efficiency by determining the candidate repair paths to perform the repair plan.

In some embodiments, the robot may be adsorbed to an inner wall of the pipeline to walk through structures such as suction cups or magnetic materials. Walking may be carried out based on remote control, or carried out automatically based on a built-in program set in advance. In some embodiments, infrared devices, cameras, etc., may be installed inside and outside the gas pipeline for detecting the situation of the inner wall of the pipeline, such as detecting the corrosion situation of the inner wall of the gas pipeline. In some embodiments, sensors may be installed inside and outside the gas pipeline for monitoring the gas pressure, flow rate, and temperature, etc., in the pipeline.

In some embodiments, the repair robot may release the loaded coating through a spraying device (e.g., a spray nozzle, or the like), and spray or smear the coating on the pipe wall of the gas pipeline.

The repair efficiency can be improved by determining a reasonable repair plan and dispatching the repair robot to carry out repair operations, and appropriate responses can be taken while grasping the overall situation of the pipeline in a timely manner to repair the pipeline efficiently and conveniently.

It should be noted that the processes are provided for illustrative purposes only, and are not intended to limit the scope of the present disclosure. For those skilled in the art, various modifications or changes may be made according to the description of the present disclosure. However, such modifications and changes are still within the scope of the present disclosure.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These modifications, improvements, and amendments are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, some features, structures, or features in the present disclosure of one or more embodiments may be appropriately combined. Characteristics of one or more embodiments of the present disclosure may be properly combined.

Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for corrosion supervision of a gas pipeline, implemented through a smart gas safety management platform of an Internet of Things (IoT) system for corrosion supervision of a gas pipeline, comprising:

obtaining inspection data of a gas pipeline in a gas pipeline network;

constructing a first pipeline diagram of the gas pipeline network based on the inspection data;

determining a corrosion probability of the gas pipeline based on the first pipeline diagram using a corrosion probability model, the corrosion probability model being a machine learning model; wherein the first pipeline diagram includes nodes and edges, the nodes in the first pipeline diagram include a first type of nodes corresponding to monitoring device installation points and a second type of nodes corresponding to pipeline demarcation points, features of the first type of nodes include the inspection data, features of the second type of nodes is null; and features of the edges in the first pipeline diagram include a gas flow direction, pipeline features, and an environmental unit feature sequence;

determining one or more estimated pipeline corrosion regions based on the corrosion probability of the gas pipeline;

obtaining in-depth inspection data of the gas pipeline by performing in-depth inspection on at least one of the estimated pipeline corrosion regions;

determining corrosion features of the one or more estimated pipeline corrosion regions based on gas monitoring data and the in-depth inspection data of the gas pipeline;

in response to the corrosion features satisfying a first preset condition, generating a plurality of candidate repair paths based on a second preset condition, and determining a target repair path by performing a plurality of iterations on the plurality of candidate repair paths based on evaluation values; wherein each of the plurality of iterations includes filtering the plurality of candidate repair paths based on the evaluation values, wherein the evaluation values include a first evaluation value and a second evaluation value; the first evaluation value is negatively related to an invalid path length of a path that a repair robot passes through; and the second evaluation value is positively related to a sum of corrosion degrees of corrosion regions that the repair robot passes through;

determining a repair plan at least based on the target repair path; and controlling the repair robot to enter the gas pipeline and repair the gas pipeline according to the repair plan, wherein the repair plan includes a repair path of the repair robot.

2. The method of claim 1, wherein the IoT system for corrosion supervision of a gas pipeline further includes a smart gas user platform, a smart gas service platform, a smart gas pipeline network equipment sensor network platform, and a smart gas pipeline network equipment object platform, the smart gas safety management platform includes a smart gas pipeline network safety management sub-platform and a smart gas data center, the smart gas user platform includes a gas user sub-platform and a supervision user sub-platform; and the smart gas service platform includes a smart gas usage service sub-platform and a smart supervision service sub-platform; and the method further includes:
obtaining the inspection data through the smart gas pipeline network equipment object platform, and transmitting the inspection data to the smart gas safety management platform through the smart gas pipeline network equipment sensor network platform;
transmitting the one or more estimated pipeline corrosion regions, the corrosion features, and the repair plan to the smart gas data center;
transmitting the one or more estimated pipeline corrosion regions, the corrosion features, and the repair plan to the smart gas service platform by the smart gas data center; and
transmitting the one or more estimated pipeline corrosion regions, the corrosion features, and the repair plan to the smart gas user platform by the smart gas service platform.

3. The method of claim 1, wherein the corrosion features include a corrosion type and a corrosion degree, and the estimated pipeline corrosion regions include a first estimated corrosion region and a second estimated corrosion region, and the determining corrosion features of the one or more estimated pipeline corrosion regions includes:
determining a corrosion type and a corrosion degree of the first estimated corrosion region based on in-depth inspection data of the first estimated corrosion region; and
determining a corrosion type and a corrosion degree of the second estimated corrosion region through a corrosion feature prediction model based on a second pipeline diagram of the gas pipeline network.

4. The method of claim 3, wherein the second pipeline diagram includes nodes and edges, the nodes of the second pipeline diagram reflect locations of demarcations of the gas pipeline or gas monitoring devices, and the edges of the second pipeline diagram reflect the gas pipeline; node features include at least monitoring data of the gas monitoring devices, and edge features include at least gas flow directions of the gas pipeline, pipeline features, environmental features, the corrosion type and the corrosion degree of the first estimated corrosion region, and an inherent confidence of the gas pipeline; wherein
the inherent confidence refers to a possibility of predicting corrosion features of a target gas pipeline according to corrosion situations of other gas pipelines in the gas pipeline network, the inherent confidence is determined based on a confidence prediction model by processing a distance between the first estimated corrosion region and the second estimated corrosion region and a gas pipeline complexity, the confidence prediction model being a machine learning model.

5. The method of claim 4, wherein an input of the confidence prediction model further includes gas monitoring data saturation, and the gas monitoring data saturation is determined based on a count of gas monitoring nodes and a degree of dispersion of the gas monitoring nodes in the gas pipeline network.

6. The method of claim 1, wherein the repair plan includes an amount of corrosion protection coating carried by the repair robot, and the amount of corrosion protection coating carried by the repair robot is related to a count of the estimated pipeline corrosion regions and a corrosion degree.

7. The method of claim 6, wherein the amount of corrosion protection coating carried by the repair robot is also related to a predicted confidence; and
the predicted confidence is determined by updating an inherent confidence of the gas pipeline through a corrosion feature prediction model.

8. The method of claim 1, wherein each of the plurality of iterations further includes:
obtaining a plurality of second candidate repair paths by processing the first candidate repair paths;
designating the first candidate repair paths and the second candidate repair paths as candidate repair paths for a next iteration; and
determining whether a current iteration satisfies a preset condition, ending the iteration in response to a determination that the preset condition is satisfied, and filtering the first candidate restoration paths and the second candidate restoration paths based on the evaluation values to determine the target repair path.

9. The method of claim 1, wherein the sum of corrosion degrees of corrosion regions is determined based on a weighted sum of corrosion degrees of corrosion regions covered by the candidate repair paths; and weights of the weighted sum are determined based on gas source distances, each of the gas source distances being a distance from a gas source point to each of the corrosion regions covered by the candidate repair paths.

10. The method of claim 1, wherein the evaluation values further include a third evaluation value; and the third evaluation value is determined based on a predicted confidence output by a corrosion feature prediction model.

11. An Internet of Things (IoT) system for corrosion supervision of a gas pipeline, wherein the IoT system comprises a smart gas safety management platform, and the smart gas safety management platform is configured to:
obtain inspection data of a gas pipeline in a gas pipeline network;
construct a first pipeline diagram of the gas pipeline network based on the inspection data;
determine a corrosion probability of the gas pipeline based on the first pipeline diagram using a corrosion probability model, the corrosion probability model being a machine learning model; wherein
the first pipeline diagram includes nodes and edges, the nodes in the first pipeline diagram include a first type of nodes corresponding to monitoring device installation points and a second type of nodes corresponding to pipeline demarcation points, features of the first type of nodes include the inspection data, features of the second type of nodes is null; and features of the edges in the first pipeline diagram include a gas flow direction, pipeline features, and an environmental unit feature sequence;
determine one or more estimated pipeline corrosion regions based on the corrosion probability of the gas pipeline;

obtain in-depth inspection data of the gas pipeline by performing in-depth inspection on at least one of the estimated pipeline corrosion regions;

determine corrosion features of the one or more estimated pipeline corrosion regions based on gas monitoring data and the in-depth inspection data of the gas pipeline;

in response to the corrosion features satisfying a first preset condition, generate a plurality of candidate repair paths based on a second preset condition, and determining a target repair path by performing a plurality of iterations on the plurality of candidate repair paths based on evaluation values; wherein each of the plurality of iterations includes filtering the plurality of candidate repair paths based on the evaluation values, wherein the evaluation values include a first evaluation value and a second evaluation value; the first evaluation value is negatively related to an invalid path length of a path that a repair robot passes through; and the second evaluation value is positively related to a sum of corrosion degrees of corrosion regions that the repair robot passes through;

determine a repair plan at least based on the target repair path; and control the repair robot to enter the gas pipeline and repair the gas pipeline according to the repair plan, wherein the repair plan includes a repair path of the repair robot.

12. The IoT system of claim 11, further comprising a smart gas user platform, a smart gas service platform, a smart gas pipeline network equipment sensor network platform, and a smart gas pipeline network equipment object platform, wherein the smart gas safety management platform includes a smart gas pipeline network safety management sub-platform and a smart gas data center, the smart gas user platform includes a gas user sub-platform and a supervision user sub-platform; and the smart gas service platform includes a smart gas usage service sub-platform and a smart supervision service sub-platform; and the IoT system is further configured to:

obtain the inspection data through the smart gas pipeline network equipment object platform, and transmit the inspection data to the smart gas safety management platform through the smart gas pipeline network equipment sensor network platform;

transmit the one or more estimated pipeline corrosion regions, the corrosion features, and the repair plan to the smart gas data center;

transmit the one or more estimated pipeline corrosion regions, the corrosion features, and the repair plan to the smart gas service platform by the smart gas data center; and transmit the one or more estimated pipeline corrosion regions, the corrosion features, and the repair plan to the smart gas user platform by the smart gas service platform.

13. The IoT system of claim 11, wherein the corrosion features include a corrosion type and a corrosion degree, the estimated pipeline corrosion regions include a first estimated corrosion region and a second estimated corrosion region, and the smart gas safety management platform is further configured to:

determine a corrosion type and a corrosion degree of the first estimated corrosion region based on in-depth inspection data of the first estimated corrosion region; and determine a corrosion type and a corrosion degree of the second estimated corrosion region through a corrosion feature prediction model based on a second pipeline diagram of the gas pipeline network.

14. The IoT system of claim 11, wherein the repair plan includes an amount of corrosion protection coating carried by the repair robot, and the amount of corrosion protection coating carried by the repair robot is related to a count of the estimated pipeline corrosion regions and a corrosion degree.

15. The IoT system of claim 14, wherein the amount of corrosion protection coating carried by the repair robot is also related to a predicted confidence; and the predicted confidence is determined by updating an inherent confidence of the gas pipeline through a corrosion feature prediction model.

* * * * *